United States Patent [19]
Medioni et al.

[11] Patent Number: 5,436,672
[45] Date of Patent: Jul. 25, 1995

[54] VIDEO PROCESSING SYSTEM FOR MODIFYING A ZONE IN SUCCESSIVE IMAGES

[75] Inventors: Gérard Medioni, Los Angeles; Gideon Guy; Hillel Rom, both of Van Nuys, all of Calif.

[73] Assignee: Symah Vision, Paris, France

[21] Appl. No.: 249,348

[22] Filed: May 27, 1994

[51] Int. Cl.$^6$ ............................................. H04N 5/265
[52] U.S. Cl. ................................. 348/591; 348/584; 348/169
[58] Field of Search ............... 348/578, 584, 585, 586, 348/590, 591, 563, 564, 565, 169–172; 382/10, 41, 57; H04N 5/262, 5/265, 5/272, 5/275

[56] References Cited

U.S. PATENT DOCUMENTS 5,264,933  11/1993  Rosser et al. .
5,274,453  12/1993  Maeda ................................. 348/584

FOREIGN PATENT DOCUMENTS 2661061  10/1991  France .
2254216   9/1992  United Kingdom ........ H04N 5/265
0015921  10/1991  WIPO ......................... H04N 5/272
0002524   2/1993  WIPO ......................... H04N 5/262
0006691   4/1993  WIPO ......................... H04N 5/275

*Primary Examiner*—James J. Groody
*Assistant Examiner*—David E. Horvey
*Attorney, Agent, or Firm*—Larson & Taylor

[57] ABSTRACT

A method and an apparatus for substituting a representation of a target, identified by a set of points of interest stored in a memory, with a matching representation of a predetermined stored pattern in successive TV frames are described. The apparatus has a buffer for storing successive frames of a sequence, constituting a first in-first out memory having a length sufficient for storing all frames over a period of some seconds. Points of interest in each current frame are extracted and an attempt is made to find at least a subset of the extracted points of interest matching with a respective subset of the stored set. Global motion of the image between successive frames is evaluated and the location of the target in the frames following and preceding a frame in which the pattern is found is predicted. A target finder locates the target in the frames where it is found, based on the prediction. Each partial or complete representation of the target in each frame, where found, is replaced with a representation of the stored pattern after the stored pattern has been subjected to size and perspective transformation computed from a comparison between the points of interest in the representation of the target in the respective frame and the respective stored points of interest.

16 Claims, 6 Drawing Sheets

FIG. 2.
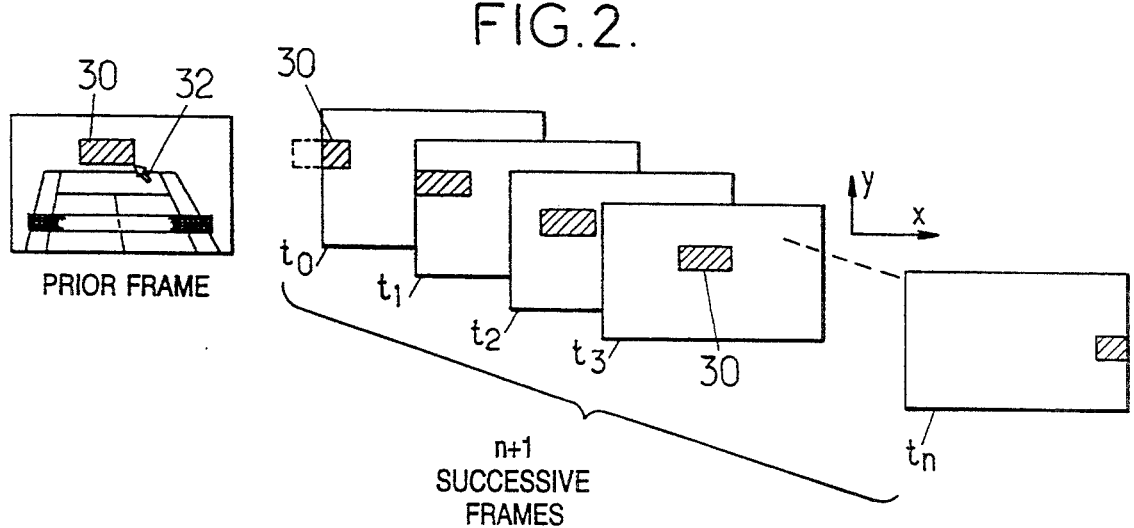
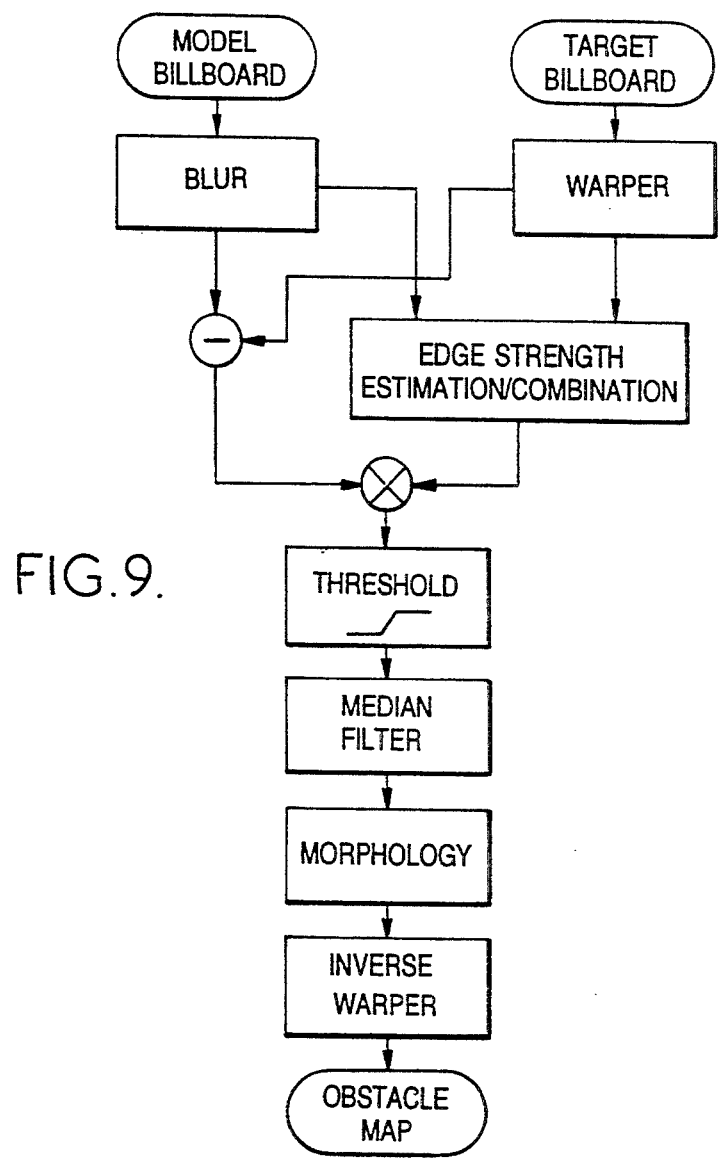
FIG. 9.

VIDEO PROCESSING SYSTEM FOR MODIFYING A ZONE IN SUCCESSIVE IMAGES

BACKGROUND OF THE INVENTION

The present invention relates to video processing systems for altering video images of a sequence of images delivered by any video source (including, but not limited to, a camera, output of a studio switchboard combining multiple cameras, or satellite down or up links), for replacing a zone (hereinafter referred to as a target) of the scene in the images, by a matching representation of a predetermined pattern. The word "frame" will frequently be used in place of "image" in the following for more clarity and avoiding ambiguities. However, processing will only occur frame-to-frame when sequential raster scanning is used. When, in most cases, conventional interleaved raster scan is used, a full frame consists of two fields with a time delay between corresponding lines in the two fields of 20 ms in Europe and 16.67 ms in the U.S. Then, either of two approaches should be selected. One of the approaches consists in processing odd field separately from the even fields. However, it is much preferable to make an evaluation of the amount of movement which occur between two fields and to use interpolation techniques for obtaining an image whose lines correspond to the condition of the scene at a same instant.

A number of techniques which enable substitution of a pattern for a target are known. Reference may for instance be made to international application WO 91/15921, the content of which is included in the present specification by way of reference. Another method, disclosed in U.S. Pat. No. 5,107,252 (Traynar et al) requires video image manipulation by repeatedly pointing at the corners of the representation of the target to be substituted on a frame-by-frame basis. U.S. Pat. No. 5,263,933 (Rosser et al) teaches using conventional pattern recognition and image processing methods for recognizing a selected portion in a display, for later insertion of a video representation of stored indicia in place of that portion. Frame-by-frame processing involving manually designating a key frame to be substituted is time consuming and tedious. Any method requiring a full pattern recognition process carried out on each image has a number of limitations. For instance, the pattern recognition algorithm will not be able to identify a billboard to be substituted until and unless a significant portion of that billboard is present in the image. That may result in sudden substitution of the billboard with another billboard after a large portion of the billboard has entered the field of the camera, which is highly objectionable.

SUMMARY OF THE INVENTION

It is an object of the invention to provide an improved system for modifying successive video images belonging to a sequence of images which are mutually correlated. It is a more specific object to provide a system which makes it possible to carry out such modification under unfavorable conditions and/or almost immediately after a target to be substituted enters the field of the display (and conversely until only a small part of it is still within the display). For that purpose, there is provided a method involving storing a plurality of successive images in a buffer memory and searching for the target in each of said images in turn by pattern recognition techniques which may be of a type conventional in the art until the target is found with reliability and then carrying out reverse and forward prediction as to the location of the target in preceding or following images, based on an evaluation of the global changes of the image, whereby precise identification of the location of the target may be achieved even when only part of the target is available within the display. In a preferred embodiment, the predicted location is up-dated as long as this is possible with reliability and consequently the target may be tracked under conditions which would render it impossible with prior art techniques.

More precisely, there is provided a method of substituting a representation of a target, identified by a set of points of interest stored in a memory, with a matching representation of a predetermined stored pattern of same geometrical shape in successive TV frames of a same sequence taken from a video camera, comprising the steps of:

(a) storing successive frames of said sequence in a buffer,
(b) extracting points of interest in each current frame of the sequence in turn and attempting to find at least a subset of said extracted points of interest matching with a respective subset of said stored set of points of interest,
(c) evaluating a motion of said camera between each said current frame where such a match is found and following and preceding frames, based on a global comparison between contents of the frame,
(d) predicting a location of said target in said following and preceding frames in the sequence from the evaluated motion,
(e) automatically searching for said target in said following and preceding frames in said sequence using the predicted locations; and
(f) replacing each said representation of said target with a replacing representation of said stored pattern after said stored pattern has been subjected to transformation computed from a comparaison between at least four points of interest in said representation of the target and the respective stored four points of interest.

There is also provided an apparatus for substituting a representation of a target, suitable for implementing the above-identified method. The apparatus comprises buffer means for storing successive frames of a sequence, constituting a first in-first out memory having a length sufficient for storing all frames over a period of some seconds (typically about 4 seconds); it further comprises means for extracting points of interest in each current frame of the sequence in turn and attempting to find at least a subset of the extracted points of interest matching with a respective subset of the stored set; means are provided for evaluating global motion of the image, i.e. the amount of motion of the camera between successive frames and for predicting a location of the target in the frames following and preceding a frame in which the pattern is found; target finding means are provided for precisely locating the target in the frames where it is found, based on the prediction. Last, replacer means are provided for replacing each partial or complete representation of the target, where found, with a representation of the stored pattern after the stored pattern has been subjected to size, perspective and/or color transformation computed from a comparison between some at least of the points of interest in the representation of the target and the respective stored points of interest.

The means for evaluating motion of the camera may use an affine motion model; however, for increased speed and better accuracy, it preferably uses a three parameter motion model.

The above and other aspects of the invention will appear from the following description of particular embodiments, given by way of examples.

BRIEF DESCRIPTION OF THE DRAWINGS

FIG. 2 is a schematic representation of a sequence of images of a same shot, indicating successive locations of a target in the field of view of a TV camera;

FIG. 9 is a flow chart illustrating the operation of an obstacle detection module which is an optional component of the system of FIG. 1.

DETAILED DESCRIPTION OF PREFERRED EMBODIMENTS

The invention will first be described with reference to a system which includes a single video source, such as a TV camera, and is programmed for replacing a representation of a "target", consisting of a specified zone in a scene as seen by the camera, or of an actual object present in the scene, typically an advertising billboard. However, a full blown system may include several cameras, for instance for broadcasting a sporting event as seen from different cameras during successive phases of the game. The system as described is valid if the target is stationary in the scene, is planar and is rigid i.e. not deformable during the sequence. The system may carry out all geometrical transforms which may be necessary if every motion is a three parameter motion, translation along a direction x, translation along a direction y and zoom. Such simplification increases the speed and accuracy of result. The system can detect scenarios when the above assumption is violated and that will reflect in the measures of belief.

In the following, the word "frame" will frequently be used rather than "image". The two terms are equivalent when the system uses sequential raster scan. On the other hand, correlation will be field-to-field, rather than frame-to-frame, when interlaced scanning is used, particularly when fast motion may exist and may cause a vertical shift between two fields which would be troublesome for prediction.

Figure 1:
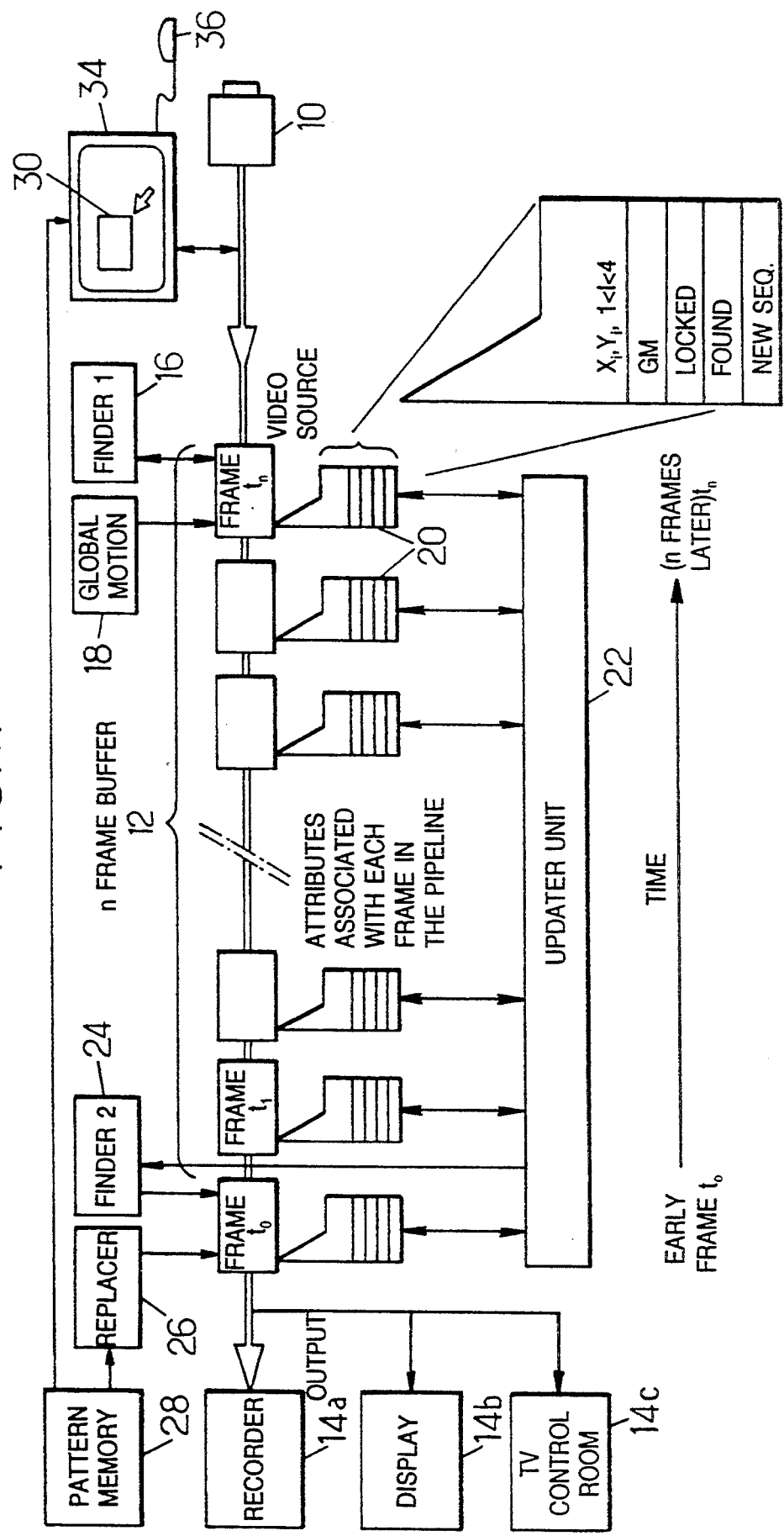
FIG. 1 is a block diagram of the system, indicating main modules thereof.

Referring to FIG. 1, the system includes a video source 10 which is a, for example, TV camera when operating in pseudo-real time, with a constant delay of some seconds required for processing, or a video tape reader, when operating off-line. The second mode of operation requires less computing power than the first mode.

The system may be considered as comprising a plurality of modules or units which may be separate data processing components or portions of computer programs, namely:

a buffer 12 having sufficient capacity for storing $n+1$ frames $t_o$-$t_n$ (n being an integer greater than 1), typically corresponding to a duration of three-five seconds, connected or programmed to operate as a shift register;

an output component which may be a recorder 14a storing the sequence of images after the pixels of a target have been replaced with pixels of a pattern, a display 14b, a transmission system 14c and the same;

a first finder module 16, whose function is to look for the target frame $t_n$, based on past history;

a global motion tracker module (GMT) 18 whose function is to compute the motion of the scene as seen by the camera (typically the motion due to changes in the line of sight and/or focal length of the camera), from the previous frame $t_{n-1}$;

a set of attribute recording units 20 each for recording the attributes of the target when the latter is found in a respective frame;

an updater unit 22, for predicting the location of the target in all the previous frames $t_o, \ldots, t_{n-1}$, based on the computed motion, if the target is first found in frame $t_n$ and for updating the attribute records accordingly;

a second finder module 24 for searching for the target in frame to, this time using the localization prediction produced by all the n previous frames;

a replacer module 26 which performs the insertion of a transformed representation of pattern read out from a pattern memory 28 (storing a single pattern or storing a plurality of patterns for possible selection between them) if the target is found, the replacer being optionally capable to further perform obstacle detection and consequent partial insertion for not removing obstacles.

The global motion tracker may preferably also be used to signal sudden changes in the scene as seen by the camera, so that the updater unit does not propagate the predictions beyond a shot.

Before the modules and units of the system are individually described, it may be useful to summarize the mode of operation and behaviour of the system under different scenarios. That will be done assuming that the system is used for replacing a billboard posted in or around stadiums, race tracks, arenas, etc., whose location and size may be defined by the coordinates of its four corners.

Referring to FIG. 2, due to movement of the camera, the representation of a billboard 30 may progressively enter the field of view of the camera and finally leave that field of view.

The system operates automatically. However, user interaction is required, only once at the beginning of the event, in the embodiment which will be described. Then, as indicated at 32 in FIG. 2, an operator selects (using a mouse or a light pen) the target billboard to be replaced in a frame where it appears in full and specifies the pattern to be put instead. That may be done by looking at the scene on a monitor 34 (FIG. 1) and indicating the corners with a mouse 36. The pattern to be inserted is selected in memory 28. The system will then identify characteristic features (to be referred to later as interest points) inside the target billboard to be replaced and/or characteristic features out of the target billboard and having a fixed relation with it in the scene as seen by the camera (for instance marks on a wall carrying the target) billboard.

That second possibility is important when the target is virtual and constitutes a non-differentiated zone of a blank surface on which the pattern has to be inserted. The characteristic features may as well be indicated by the operator, again using the mouse, rather than identified by the device. The operator can change his selection of the target at any point during the event.

From that time on, the system will be capable of replacing targets which enter the field of view (as seen at the left of FIG. 2), which exit the field of view, during zooming in and zooming out, on the condition that, in at least one of the frames of the sequence, the number of characterizing features as seen in the field of view are in sufficient number and sufficiently accurate for pattern recognition to occur, since recognition will propagate forwardly and rearwardly from that frame due to a unique feature of the system and method of the invention.

The various components will now be described.

FIRST FINDER MODULE

Figure 3:
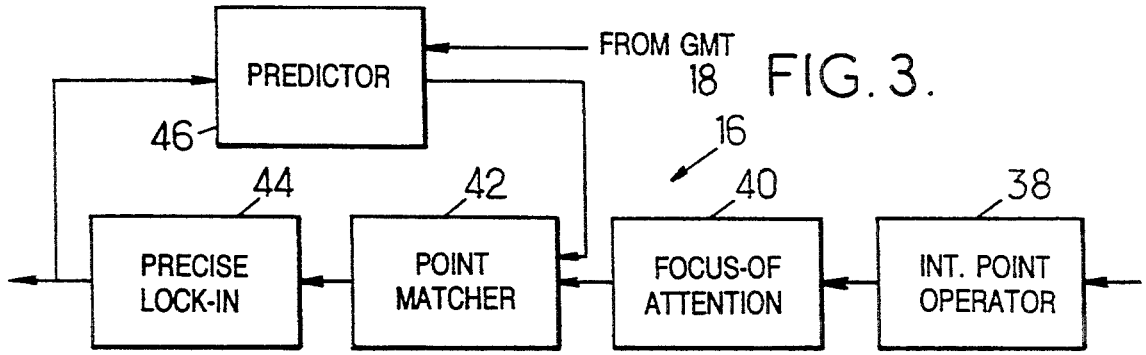
FIG. 3 is a block diagram of the first finder module of FIG. 1.

Referring to FIG. 3, the first finder module 16 may be considered as comprising five sub-modules.

Starting from the input, the sub-modules are as follows.

An interest operator 38, referred to as "point operator" in the following, extracts characteristic features, usually corners or crossing lines, in the image and identifies them on neighbourhoods of for instance 6×8 pixels.

A color-based focus-of-attention sub-module 40 is designed to select the interest points which are most likely to be found in the target, based on color information.

A point matcher 42 constitutes the core of the first finder module 16. Its function is to find a set of corresponding points between interest points in a stored model of the target and interest points found in the actual frame $t_n$. The point matcher will generally use an affine transform and a hash table created for the matching. It may implement well-known pattern recognition processes.

A precise lock-in (PLI) sub module 44 is for finding the precise (typically to a sub-pixel resolution) location of the target in the frame, given the correspondences obtained from point matcher 42.

Last, a predictor sub-module 46, based on information received from the PLI sub-module 44 and from the global motion tracker 18, predicts the location of the billboard in any frame of order n, assuming that the target was found in frame n−1.

Figure 4:
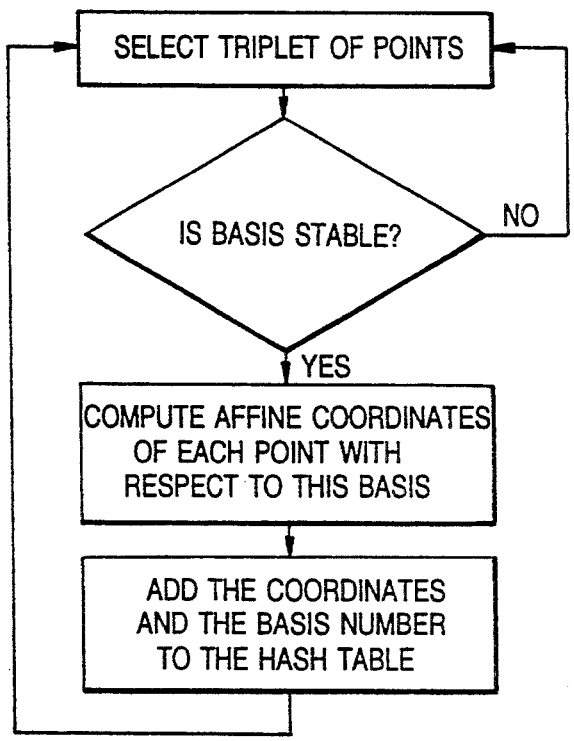
FIG. 4 is a flow chart of a preprocessing step.

For operation, the first finder module requires completion of a preprocessing phase, which will be described with reference to FIG. 4, to extract relevant features from the model of the target. The information as extracted from the target model may comprise:
  color information, used by the focus-of-attention sub-unit 40,
  feature points or characterizing marks, used by the point operator 38,
  a hash table, created for the matching, which will be referred to more completely when describing the point matcher 42.

The point operator sub-module 38 has to detect and locate a certain number of "interest points" or "characterizing marks" on the target. The interest points are typically corners and vertices, that are very often seen on letters on a billboard, for example, and more generally any point which is distinct from its surrounding. The set of points found by this sub-module on any frame will then be compared to the set of points found on the target model (processed in exactly the same way) to try to find a similarity and a match.

Several requirements will typically define the meaning of interest points in the implementation of the invention.

Distinctness and uniqueness: a point of interest should be distinct from its surrounding, according to its intensity (radiometric value). This point is to be unique in a certain area since clusters of points or very close points would confuse the matching step.

Invariance and stability: since the interest points will be used for the matching of the target, by making a comparison to the points on the target model, the same points are ideally to be found on the same object, seen in different conditions. However, the application is such that there will be varying conditions such as changes of viewpoint and scale, changes of contrast, changes of illumination, strong blur in the case of a fast-moving camera.

Two different interest operators, respectively based on the calculation of the first and second derivatives of the image, may typically be used. The operator using first derivatives of the image gives more stable results and will generally be preferred. It is as follows:
  Compute the first derivatives of the image I(x,y) and calculate the images $I^2_x$, $I^2_y$ and $I_xI_y$.
  Convolve these three images with a large box filter typically (size 9×9), leading to three images $n_{11}$, $n_{22}$, $n_{12}$. A matrix N may be defined at each point belonging to row r and column c as:

$$N(r,c) = \begin{bmatrix} n_{11}(r,c) & n_{12}(r,c) \\ n_{12}(r,c) & n_{22}(r,c) \end{bmatrix}$$

From N, a weight image may be calculated which represents the "interest" of a point and an isotropy image. These values are given at each point by:

$$w(r,c) = \frac{2detN(r,c)}{trN(r,c)} \text{ and } q(r,c) = \frac{4detN(r,c)}{tr^2N(r,c)}$$

where det designates the determinant of matrix N, tr designates the trace (sum of diagonal terms) and q designates the quotient.

The weight image is compared with a threshold for leading to an image h(r,c) which will be defined as:
  w(r,c), if w(r,c) is superior to a threshold and q(r,c) is superior to a threshold, and
  0, in all other cases.

A non-maxima suppression is performed on the thresholded image to avoid clusters of points. Use of a window of 9×9 pixels has given good results.

The different numerical values used (thresholds, window sizes) may be set once and for all and satisfy most types of images. Typically, these values are optimized for a target consisting of a billboard in full focus and of "reasonable" size, i.e. not too small (because there would not be enough points for the point marcher module 42 to work) and not too big (because there may be too many points, making it impossible for the matcher to choose the most relevant ones).

The focus of attention sub-module 40 is designed to select the interest points which are most likely to be located on the target. A Local Histogram approach may be used. However, due to its computational complexity, another approach has been found preferable for color-based selection of interest points.

Since the focus of attention is used for selecting feature points, it is sufficient to test the color information at the feature points only, thus reducing the computation time.

A preferred approach uses the finding that interest points are usually junctions of two different colors and only requires that an operator selects the possible pairs of colors in the model (in most cases there are only one or two possible pairs) at the preprocessing stage. At the on-line processing, a window of some pixels in line and column around each feature point is tested. For each pixel in the window, the distance of its color to the closest color of the model is recorded. These distances are summed over the window. A score inversely proportional to the computed distances is assigned to the feature point and it is required that the window will have both colors of the color pair. Since distances in color space are used rather than quantization, this process is robust. The results have been found highly reliable.

The task of the point matcher sub-module 42 is to locate the target billboard in every frame, without any a priori knowledge and, for that purpose, to match the interest points found by the interest point operator sub-module 38 with the interest points of a stored target model. This is done in order to find the transformation between the stored model of the target and the target representation in the actual image and, therefore, the position of the target in the actual image where the target is supposed to be.

For that purpose, several methods may be used. However, it is of advantage to use an affine-invariant matching technique.

According to that method, the image coordinates are assumed to be affine-transformed coordinates of the model coordinates.

For each point of the target model $(x_m, y_m)$, the coordinates of the corresponding points in the image are then $(x_i, y_j)$, where:

$$\begin{bmatrix} x_i \\ y_i \end{bmatrix} = \begin{bmatrix} a_{11} & a_{21} \\ a_{12} & a_{22} \end{bmatrix} \begin{bmatrix} x_m \\ y_m \end{bmatrix} + \begin{bmatrix} b_1 \\ b_2 \end{bmatrix}$$

which may be written as:

$p_i = A p_m + b$

The purpose of the point marcher sub-module is to find the transformation given by the pair (A, b), knowing only two sets of supposedly corresponding points. As already indicated it is not certain that all the points obtained from the image have a corresponding point in the target model, and inversely whether all the points of the target model have a corresponding point in the image. Only a subset of each set will then correspond. The size of this subset should be as large as possible and is determined by the performance of the interest point operator and also conditioned by the availability of the full target in the current image.

The point marcher sub-module carries out two steps in succession: the preprocessing step, and the recognition step.

The preprocessing step (FIG. 4) is the initial processing of the points in the pattern model and as so is done only once at the beginning of a sequence, off-line. Its goal is to compute the affine coordinates of all the model points with respect to all possible stable bases (triplets of points in the described embodiment) found in the model. Each pair of affine coordinates is stored, along with the basis triplet that produced it. For efficient computing, this data is stored in a two-dimensional hash table. A pair of affine coordinates (x, y) will be stored in the hash table at coordinates (f(x),f(y)). The hash function f is typically arctangent, which gives maximum discrimination for small values and is of advantage since the affine coordinates are most likely to be small.

The use of stable bases is needed for two reasons. First, any triplet of points will not give a reliable basis. If, for example, the three points are colinear, the basis is not valid. If the angle between two vectors of the basis is small, then the basis will not be reliable because any error of measure in one point of the basis will produce very different affine-invariant coordinates. The second reason to consider stable bases only is that the number of bases is initially very high, namely $N(N-1)(N-2)$, and processing of all the bases would take much computing time. It is therefore important to reduce this number. A selection criteria found of interest relies, first, on a measure of angles: the three angles of the triangle formed by the triplet of points should not be too small. Bases whose points are too close together are also eliminated.

The recognition or matching step (FIG. 5), uses as an input the set of interest points of the image, some of which are supposed to match the points of the model. The image points are basically processed in the same way as the model points were processed in the preprocessing. For a given stable basis, the affine coordinates of all the image points with respect to this basis are computed.

If the affine-coordinates of a point hash to the same bucket of the hash table has the affine coordinates of a model point, then a vote is given to the model basis that produced those coordinates.

When the affine coordinates of all the points have been calculated, a check is made to see if any model basis obtained a sufficient number of votes to possibly have a match. If so, the transformation (A, b) from the image basis and this model basis, and the number of points that actually correspond are calculated. First the transformation is checked to see that it actually satisfies the application. For instance no upside-down or inverted billboard, no serious deformation should be found. Then the number of points in correspondence is determined. If this number is low (for instance lower than 7), then the match is considered unsatisfactory and the next stable basis of image points is tried. If the number of corresponding points is very high, (at least 12 in the same example) the match is declared very satisfactory and exit the program.

Between those two values, a "weak" match is declared and the parameters of the transformation are kept, but still other bases are tried to see if it is possible to find a better match.

If, after all stable bases have been tried, no "solid" match (12 points or better) has been found, the best of all the weak matches, if any, is retained.

To reduce run-time, it is preferable not to try all the possible stable bases of the image, since their number may be very high, namely $N(N-1)(N-2)$ where N is the number of image points. Considering a minimum of 20 to 30 points, this leads to an order of magnitude of 10,000 bases. Only a certain number of stable bases, typically of the order of 100 may be sufficient, considering that if the match is obvious, the program will find it very quickly, and on the other hand if the program has not found the match after 100 different stable bases, then there is nothing to match, either because the target is not there or because there are not enough good feature points for the matching.

For strengthening the recognition power, predicted corners from the predictor (when available) may be used to make sure that the match found is correct. This is done by simply checking that the sum of distances from the found corners to the predicted corners is not too large.

Second, labeled points may be used. Points carry a label corresponding to their color environment in the image (for example if the billboard is a red, black and white Marlboro sign, interest points surrounded by black and white will have the label 1, and points surrounded by red and white will have the label 2). During the voting process, a given point will only vote for points carrying the same label. Furthermore, after the voting, two points will be matched only if they carry the same label. This has the double advantage of speeding up the execution significantly, and of giving better recognition results.

The number of points that the matcher can handle is limited, for example to approximately 40 points in the whole image. A partitioning strategy for the marcher may then be used for easying the requirements when there are not enough feature points on the billboard itself when trying to find a billboard in the full resolution image. Then a first step is to separate the image in two and to run the first finder 16 on each half. The first finder 16 will look for the target billboard first on the left half, then on the right half, then on the top half, on the bottom half and finally on the whole image. This strategy may be successful in situations where the target billboard could not be found when directly searching the full image.

The precice lock-in sub-module 44 (PLI) is designed to provide a tight localization for the target billboard, given either an approximate location or a set of corresponding interest points between the target model and the current image. The precise lock-in sub-module 44 is immediately after the point matcher sub-module 42, to provide for precise localization only when the target has been found.

A second precise lock-in sub-module (not shown) will be found in the second finder module 24 and is fed by the updater unit 22 which provides it with hypothesized locations, normally computed in the updater unit, as will be seen later.

The precise lock-in sub-module 44 may use a full perspective transform. However, the sub-module which will now be described uses a three parameter transformation model instead of the full perspective transform, for better accuracy. The sequence of phases is then as follows.

Sub-pixel localization of feature points—The inputs comprise a list of corresponding points, as generated by the point marcher, a complete list of feature points in the target model, the target image and an image of the target model to be found. The process is divided into three phases:

Obtain a rough estimate of warping parameters. These are the 8 parameters (hereinafter $a_{i,j}$, with i and j being 1, 2 or 3) that describe the warping or the perspective transform from (u,v) to (x,y).

$$[x'\ y'\ w'] = [u\ v\ w] \begin{bmatrix} a_{11} & a_{12} & a_{13} \\ a_{21} & a_{22} & a_{23} \\ a_{31} & a_{32} & 1 \end{bmatrix}$$

where $x=x'/w'$ and $y=y'/w'$ ($w'$ being the enlargment coefficient).

Then a standard least mean square (LMS) calculation is performed using all the corresponding points to obtain the estimate.

In an implementation which provided good results, the PLI sub-module 44 warps small neighborhoods of feature points (in the model) using the above rough transformation, and tries to correlate them with the corresponding location of feature points in the image. The correlation is done locally only, typically in a $10 \times 10$ pixels window around the approximate location. This may be simply done by computing the Sum of Squared Differences (SSD) and yields a localization up to one pixel.

Values that are above a given threshold are discarded, to avoid using false matches due to obstacles. Currently, a threshold of 50,000 was found satisfactory in most cases.

Next a sub-pixel estimation is performed. The estimation is performed separately in x and y, and uses the value of the SSD for the best location and its two neighbors. A parabola is fitted to these three points, and the location of the maxima is completed. Now another least mean square on all the pairs of matched feature points yields a more precise perspective transform from actual model to image.

During a last stage, an attempt is made to correlate small masks around all other feature points (i.e. the feature points from the model which were not matched by the point matcher 42, and thus not used in the previous stage.) This is not done in the second stage since the original estimate of warping may not be sufficient to predict the location of these feature points in the target image, within the allowed range, typically $\pm/5$ pixels if the warped neighborhood and window are $10 \times 10$ pixels.

Now, with the more precise transfomation available, the new matches (if any) are added to the least mean square (LMS) scheme, to come up with the final perspective transform.

Finally, the corners of the model billboard are transformed using the above transformation to derive the location of the corners in the image under consideration.

A simpler model of warping (affine model) may be used for a single camera scenario. This model reduces the computation time, and allows for a better stability check, without any visible degradation in quality in that particular case.

The predictor sub-module 46 is a small sub-module of the first finder 16, designed to compute a simple prediction of location from one frame to the other.

Assuming the point marcher sub-module 42 was able to find the target billboard in frame t, the predictor, with the aid of the motion parameters, delivered by the GTM module, will predict the location in frame t+1. It is possible to carry the prediction over many frames, as long as the point matcher 42 found the target in some earlier frame. A measure of belief (MOB) is attached to every prediction, and when that MOB drops below a certain threshold, the point matcher 42 is advised not to use that prediction. At a sequence break (also reported by the GMT), the predictor 46 resets.

When a predictor sub-module is provided, the point matcher 42 uses the prediction as a focus of attention, in the same way as the output of sub-module 40, when such prediction exists. This set-up allows for a tracking mode, and improves the reliability of the overall system by keeping measures of belief high. When the target is a billboard, it was found that if the predictor is within 5 pixels of the corners of the billboard, the PLI submodule 44 is able to lock-in regardless of whether a match was found. This performs as an implicit tracking mode.

At this stage, it may be useful to give a possible strategy for selecting interest points off-line, based on colorimetry, using operator interaction; the general lines are those already mentioned when describing the focus of attention sub-module 40.

First, as already indicated, an operator selects the target to be replaced on an image where it appears in and may for instance click a mouse on four corners thereof.

Typically, the operator will also indicate a zone of the scene to be searched in the field of view of the camera, if interest points are located out of the target out of the target are to be stored. The system will then store a number of interest points out of the target which will make it possible to predict appearance of the target in the field of view when moving the camera or zooming.

After the target and the zone have been indicated, the operator has to select a pair of colors for which there are a large number of points where a contrast occurs. Such a condition may for instance exist for two pairs, namely white-black and blue-black. That selection is made by pointing several points of a same pair and clicking the mouse on them. The system is programmed for finding the closed contrast point, making it unnecessary to achieve a high degree of manual accuracy. Typically 6–10 points are sufficient. Then the system automatically searches for all "interest points" in the zone. Frequently a large number of points are found. The system will retain a predetermined number of points for which the color comparison with the clicked points is best(30–40 points for example). If felt necessary, the same sequence will be repeated with another pair.

Such a preprocessing step may be carried out before broadcast begins, there is no requirement other than availability of the TV camera on the site of the event.

Then, on-line, during broadcast, the first finder module searches the first image which selects all points which could be interest points. It Classes the possible interest points, typically based on several criteria, typically the colorimetric distance to colors of the selected pair and weight (a comparison with a threshold permitting to reject "weak" points). Only a predetermined number of points, presumably having the best probability to be interest points are retained.

On each following image, as it enters the buffer 12, the same selection of a predetermined number of points is repeated.

Figure 5:
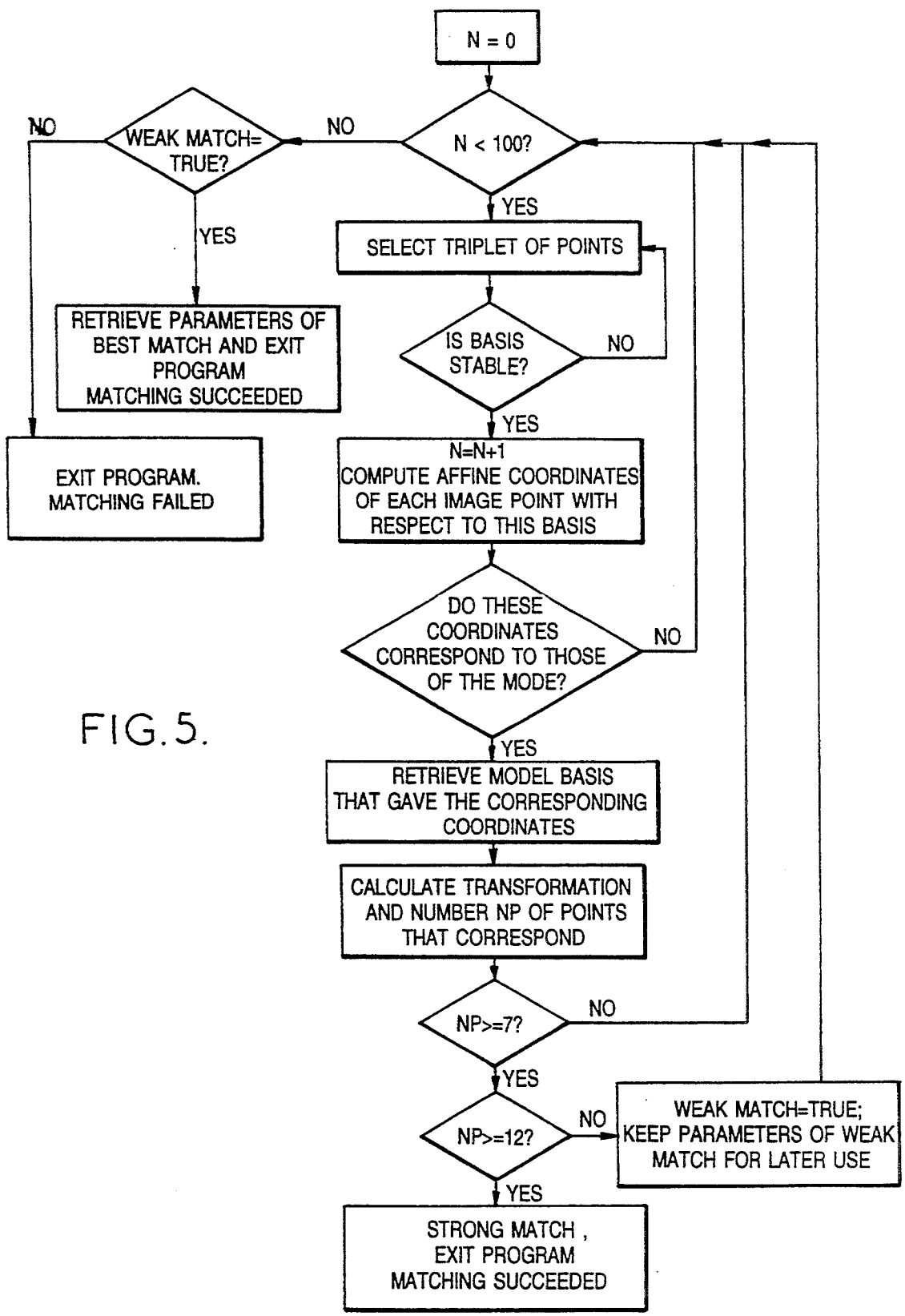
FIG. 5 is a flow chart of the matching step during operation of the system.

Then a determination is made of the largest sub-set of points for which there is a geometrical correspondence with the interest points of the target model(s), possibly taking affine transformations of the model into account, as already described with reference to FIG. 5.

GLOBAL MOTION TRACKER MODULE 18

Figure 6:
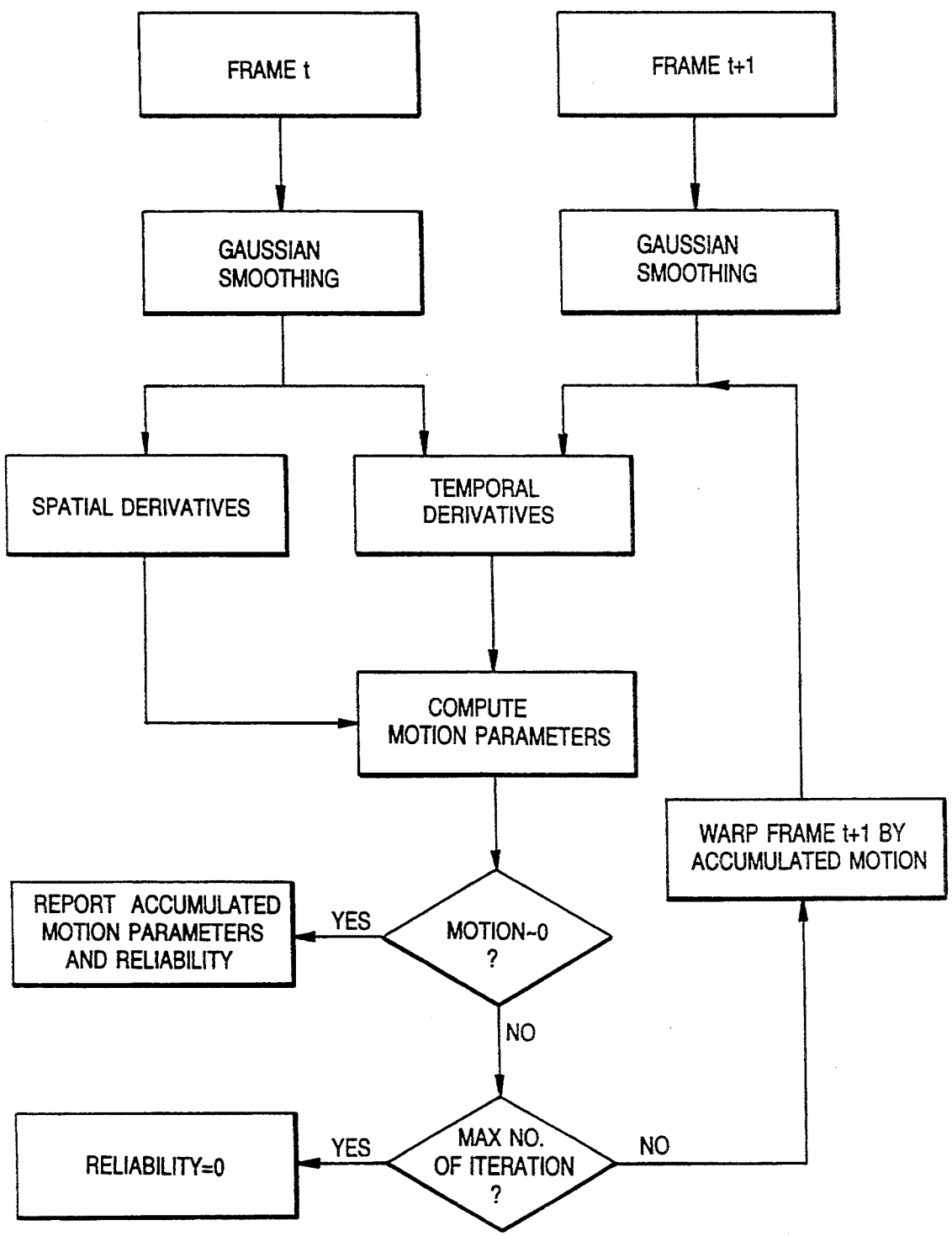
FIG. 6 is a flow chart giving a general outline of the global motion tracker module of FIG. 1.

Global motion tracking is the process of detection of the camera motion between frames and the registration of the scene. The GTM computes estimates of the global camera motion parameters between consecutive frames t and t+1 and its operation on two consecutive frames is outlined in FIG. 6.

As shown, the images are first smoothed to increase the spatial correlation. The spatial and temporal derivatives are then computed. Using this information, estimates to the motion parameters are computed. Different methods may be used. For instance, the method given in J. R. Bergen et al. "A Three-Frame Algorithm for Estimating Two Component Image Motion", PAMI, Vol. 14, No. 9, Sep. 1992, pp. 886–896 has given good results.

Using the estimates, frame t+1 is warped towards frame t, and the process is repeated. Since frame t+1 gets closer to frame t at every iteration, the computed motion parameters get more and more accurate. The process is stopped when the change in the computed motion parameters has converged to a point that they are under a predetermined threshold. The accumulated parameters are then reported to the updater unit 22. If, however, the motion parameters do not converge after a given number of iterations, then the process is stopped with a report of zero reliability.

Two motion models may be used, namely a 6 parameter constant depth general motion as in Rom et al, Motion based segmentation, International Conference on Pattern Recognition, Atlantic City, N.J., 1990 pp. 109–113 and the affine motion model as in Bergen et al referred to above. Both models allow for accurate motion recovery between consecutive frames.

The algorithm may be implemented at multi-resolution levels. A Gaussian pyramid is created from each frame. At the beginning of a sequence, the above algorithm is applied to the lowest resolution level. The results from this level are propagated as initial estimates for the next level up, and so on until the highest level. This allows for recovery of larger motions. Within a sequence, the results from the previous pair of frames are usually good estimates for the current pair, therefore the algorithm is applied to one lower resolution level only, with the previous results as initial estimates. This allows for fast recovery of the motion while accommodating for large changes within the sequence.

For more accurate and stable results in the presence of moving obstacles in the scene, the coefficients of the motion equations may be scaled reversely proportional to the temporal derivatives. Moving obstacles will not register when the images are warped according to the camera motion. Therefore, the pixels corresponding to obstacles will have high temporal derivatives and consequently will have less weight in the coefficients. The improved results allow for longer propagation of estimates along the sequence.

The parameters recovered are highly accurate and allow for the propagation of the target location along many frames. The algorithm only fails when the motion is drastically different than the modeled motion, such as in the case of very fast rotations not in the plane.

It is possible to integrate a predictor into the GMT program. This predictor computes an initial estimate for the next frame, based on the computed results from a predetermined number (typically four) of previous frames. In many cases this allows for more accurate initial estimates and therefore for faster convergence. However, where the motion changes from frame to frame, the predictor is slow to pick-up the change and use of a prediction based on one previous frame may prove preferable.

As already indicated, sequence breaks should be detected

A sequence break sub-module may be integrated in the Global Motion Tracking module 18. The sequence breaks can be detected based on changes in the moments of the images. They are indicated as "new seq" among the attributes (FIG. 1).

UPDATER MODULE 22

Figure 7:
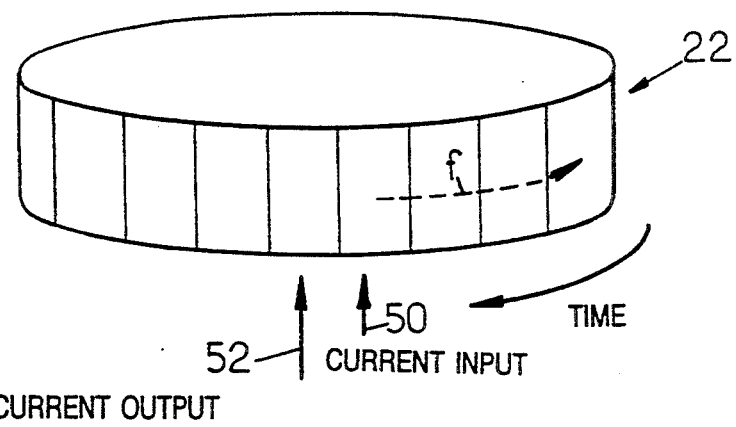
FIG. 7 is a schematic representation of an implementation of a data base in the updater unit of FIG. 1.

The task of the updater unit 22 is to collect data from all other modules and interpolate missing or inaccurate information within a processed sequence. The module may be represented as a circular buffer, having a frame and a frame attribute in each of its cells, as indicated in FIG. 7, with input and output pointers 50, 52 which are always adjacent and move with time. Arrow f represents forward update, and is not limited in its extent.

The updater unit 22 manipulates only these attribute records which are composed of a small number of parameters.

As shown, the structure of the attribute record is as follows (FIG. 1):

A global motion transformation Gm between self and next, plus a measure of belief.

A transformation between next and self, plus measure of belief (not the same as the above).

A flag representing the position of the frame in the sequence (first, last, etc.)

A linked list of hypotheses, each containing four corners in image coordinates (if the target has four corners) plus a measure of belief.

Figure 8:
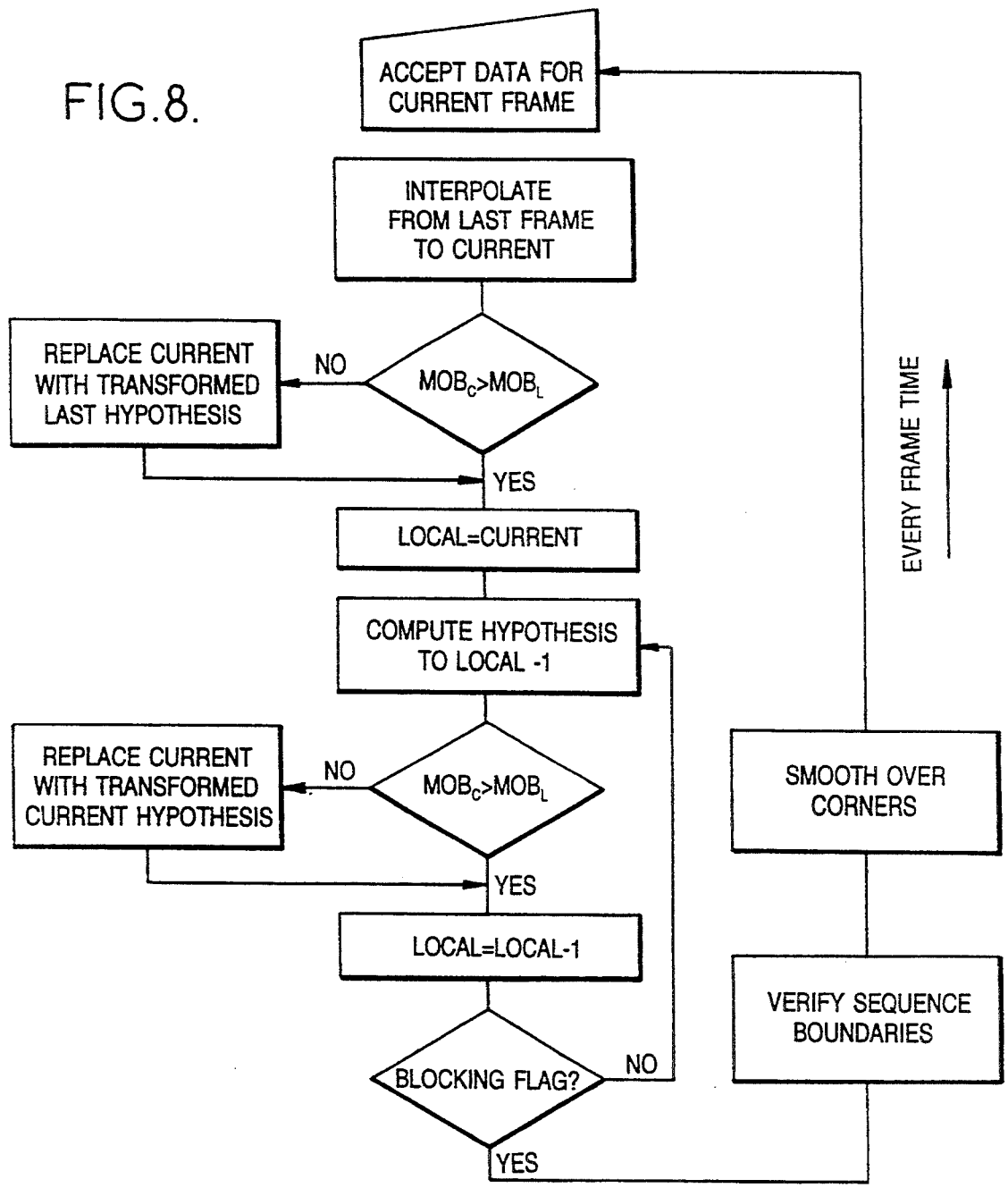
FIG. 8 is a flow chart illustrating operation of the updater unit of FIG. 1.

The flow of events in the updater unit is depicted in FIG. 8. A complete cycle of the flow diagram is performed every frame time. Inputs from other modules are read in, and a hypothesis from the last to current frame is computed and compared with current hypothesis. If better, it replaces it.

Then the propagation backward in time is started. Hypotheses are computed between consecutive frames and compared with previous measures of belief. If larger, they replace the old hypothesis.

The propagation process is stopped if a blocking flag is encountered in the process. A blocking flag can be due to a scene change, a high-enough existing measure of belief, or a low-enough measure of belief for the current hypothesis.

The complexity of the updater unit 22 is linear in the size of the buffer and of the sequence length.

A value of 1 (or close to 1) denotes high certainty of the input parameters. A low value (or 0) means that the input parameters are unreliable, and should not be used unless some reinforcement is given by other modules.

For example, when the first finder 16 fails to find the target in a frame, it will assign a "zero" certainty to the data it hands to the updater unit. The updater unit 22 will then try to interpolate the position of the target in that frame using data from the GMT 18 and/or previous frames, and/or future frames available in the buffer 12. The updater unit 22 will then change the measure of belief accordingly.

The decision of whether to transmit a given sequence is made as late as possible, i.e. when the first frame of the current sequence is about to exit the buffer 12. The updater unit 22 then evaluates the global quality of the sequence (which is again a global measure of belief. If it passes a given threshold, a decision is made to transmit with replacement of the target by the pattern: that may be indicated as "locked" in the attributes (FIG. 1).

To handle sequences that are larger than the buffer size, the updater unit can be designed to flag the replacer module 26 to cross-dissolve back to the target billboard if a failure is detected further away in a sequence longer than the length of buffer 12.

In a preferred embodiment, the system comprises means for carrying out blur estimation. Blur estimation is useful for accurate localization of a known target billboard in an image, for the detection of obstacles in the target area and for realistic rendering of the replacing pattern image. It will only be dealt with blur estimation for rendering and obstacle detection purposes, assuming that the target has been detected in the images and the location of the four corners of the billboard are available.

Image blur occurs in video sequences in one of two forms: blur due to bad focus and blur due to camera motion.

Focus blur in an image can be modeled as the image convolved with a Gaussian kernel of predetermined size $\sigma$.

Motion blur in an image is a function of the real motion between successive frames. The motion in each frame can be modeled as a linear motion in a certain direction with certain horizontal and vertical components. The actual blur effect can be modeled by convolving the image with a rectangular kernel.

Focus blur may be estimated by a correlation based method. A set of target billboard images may first be generated from the model billboard image with varying amount of blur by using a set of Gaussian kernels of different sizes $\sigma_i$. Then a set of small windows centered at billboard interest points from the target billboard are used to find the best matching blurred billboard by correlation. Since the model billboard and the target billboard usually are of different sizes and at different locations, the windows from the target billboard must be warped to the model billboard coordinates before the correlation can be performed. The correlation values of each window with the corresponding window in the blurred model images are computed and the $\sigma_i$ of the model image with the smallest correlation value is assigned to the window. At the end, all the assigned $\sigma_i$s are used to estimate the focus blur using an averaging scheme with noise filtering.

The estimated blur parameters may be used in two ways. One is to preprocess the model billboard for obstacle detection purpose and the other is to render the replacing billboard with the same kind of blur that is present in the image, explained in the following sections.

Obstacle Detection is not always necessary. When for instance broadcasting sporting events where players are sometimes in front of billboards, obstacle detection becomes necessary it consists in extracting, inside and around the target, regions that belong to objects in front of the target, so that they can be retained when the target is replaced.

An obstacle detection module may be based on the differences between the stored model billboard and the target billboard as seen and operate according to the flow chart of FIG. 9. The model billboard is first blurred with blur parameters estimated as hereinbefore described, and the target billboard is warped to the model billboard coordinates. The difference of the two is then computed. The process is preferably done in the model billboard image space because, in this way, the processing is always performed on a fixed size (and presumably large) billboard, which eliminates the problems often associated with the changing sizes of the target billboard.

The difference image is then weighted by the edge-strength map to compensate for the effects of small offsets that usually exist between the model billboard and the warped target billboard, due to localization accuracy. The result is then thresholded and filtered before it is warped back to the target billboard image space.

For instance, broadcasting a sporting event, the target billboard may have such a location that there is no possibility for an obstacle to be in front of it. On the other hand, obstacles which are typically movable may be found and temporarily mask part of all of the target.

This general scheme of obstacle detection may be implemented both in gray scale (intensity) image space and in RGB color image space.

REPLACER MODULE

The replacer module takes a target image with corner locations and an obstacle map of the billboard, and replaces the billboard with a specified replacing pattern image.

The core of the replacer module is then a replacer warper.

The warping transformation is based on the invariance property of points on a plane under perspective transformation as explained in the paper by E. Barret et al "Some invariant linear methods in photogrammetry and model matching" in Proceedings of Computer Vision and Pattern Recognition, Urbana-Champaign, Ill., June 1992, p. 122 seq. Given four corresponding points $(P_i, q_i)$ in the replacing billboard image and $(P_i, q_i)$ in the target image, $i=1, \ldots, 4$, any other point $(p, q)$ in the replacing image that corresponds to a given point $(p,q)$ in the target image can be found by solving a pair of linear equations. The cross-ratio of determinants of a set of five points in the replacing image is defined as:

$$\frac{\begin{vmatrix} 1 & 1 & 1 \\ p_1 & p_2 & p_3 \\ q_1 & q_2 & q_3 \end{vmatrix} \begin{vmatrix} 1 & 1 & 1 \\ p_1 & p_4 & p \\ q_1 & q_4 & q \end{vmatrix}}{\begin{vmatrix} 1 & 1 & 1 \\ p_1 & p_2 & p_4 \\ q_1 & q_2 & q_4 \end{vmatrix} \begin{vmatrix} 1 & 1 & 1 \\ p_1 & p_3 & p \\ q_1 & q_3 & q \end{vmatrix}} = C(1,2,3,4,p,q)$$

Similarly, the cross-ratio of the determinants for the corresponding points in the target image can be defined as $C(1,2,3,4,\overline{p},\overline{q})$.

The invariance condition:

$$C(1,2,3,4,p,q) = \overline{C}(1,2,3,4,\overline{p},\overline{q}) \quad (2)$$

defines a linear relationship between the unknown (p,q) and the known quantities. By exchanging point 1 and 3, in the above relationship, a second equation can be generated:

$$C(3,2,1,4,p,q) = \overline{C}(3,2,1,4,\overline{p},\overline{q}) \quad (3)$$

The point (p, q) can then be found by solving the above two linear equations.

The obstacle map provided by the obstacle detection module is used to keep part of the image pixels inside the target billboard unchanged so that obscuring objects can still be seen after the replacement. For realistic rendering effect, the results from the blur estimation module is also used to prepare the replacing billboard image by blurring the image with the same amount of the focus and/or motion blur that is estimated from the target billboard.

Other modifications of the structure and processes illustrated above may be practiced within the scope of the invention. It is accordingly intended to define the invention only in accordance with the following claims.

We claim:

1. A method of modifying video images which belong to a sequence and which are mutually correlated, said method comprising the steps of:

storing a representation of a target to be replaced with a stored model in said images;

storing a plurality of successive ones of said images of said sequence in a buffer memory;

searching for the target in the stored images by pattern recognition until the target is found with reliability in at least one of said stored images;

carrying out reverse and forward predictions as to the location of the target in said stored images which precede and follow the image where the target is found, based on an evaluation of global changes of the stored images, whereby precise identification of the location of the target in a particular one of said images is achieved even when only part of the target is available within the particular image; and replacing said target with a respective representation of the model.

2. A method of substituting a representation of a target, identified by a set of points of interest stored in a memory, with a matching representation of a predetermined stored pattern of same geometrical shape, in successive TV frames of a sequence of frames taken from a video camera, said method comprising the steps of:

(a) storing successive frames of said sequence in a buffer, (b) extracting points of interest from each current frame of the sequence in turn and attempting to find at least a subset of said extracted points of interest from each current frame which matches with a respective subset of said stored set of points of interest, (c) evaluating motion of said camera between each current frame where such a match is found and following and preceding frames in the sequence, based on a global comparison between contents of the frames;

(d) predicting locations of said target in said following and preceding frames in the sequence from the evaluated motion, (e) automatically searching for said target in said following and preceding frames in said sequence using the predicted locations; and (f) in each searched frame, replacing the representation of said target with a representation of said stored pattern after said stored pattern has been subjected to transformation computed from a comparison between a plurality of points of interest in said representation of the target in the respective frame and the stored points of interest.

3. Method according to claim 2, wherein said points of interest include corners and vertices in the representation of the target.

4. Method according to claim 3, wherein said points of interest are obtained by applying an operator using first derivatives of an image as represented by each frame, said method further comprising the steps of:

(b1) computing first spatial derivatives of a radiometric value I throughout the image and computing $I^2_x$, $I^2_y$ and $I_xI_y$, where x and y designate a line scanning direction and direction orthogonal to the line scanning direction, respectively, (b2) convolving $I^2_x$, $I^2_y$ and $I_xI_y$ with a box filter to obtain three substitute images $n_{11}$ $n_{22}$, $n_{12}$, and (b3) starting from $n_{11}$, $n_{22}$ and $n_{12}$, computing a weight image and an isotropy image, comparing the weight image and the isotropy image with respective thresholds and retaining only those values in the weight image for which both the weight image and the isotropy image are higher than the respective thresholds.

5. Method according to claim 2, further including a preprocessing step comprising extracting relevant features from a model of the target, said preprocessing step including detecting triplets of points constituting stable bases and storing said triplets along with a pair of affine coordinates associated therewith.

6. A method according to claim 5, wherein said preprocessing step further includes:
manually designating in one frame, a pair of colors by pointing at a plurality of points separating the colors of said pair,
automatically selecting, as said points of interest, some other points in at least part of said frame which separate said colors, prior to extracting said relevant features including said points of interest.

7. An apparatus for substituting a representation of a target, identified by a set of points of interest stored in a memory, with a matching representation of a predetermined stored pattern of same geometrical shape, said substituting to take place in successive TV frames of a sequence of frames taken from a video camera, said apparatus comprising:
buffer means for storing successive frames of said sequence, said buffer means comprising a first in-first out memory having a length sufficient for simultaneously storing a predetermined plurality of said frames over a period of some seconds;
means for extracting points of interest in each current said frame of the sequence in turn and attempting to find at least a subset of the extracted points of interest matching with a respective subset of the stored set;
means for evaluating global motion between successive frames and for predicting a location of the target in the frames following and preceding a frame in which the pattern is found;
target finding means for precisely locating the target in the frames where it is found, based on the prediction;
replacer means for replacing a partial or complete representation of the target in each frame where it is found, with a representation of the stored pattern after the stored pattern has been subjected to size and perspective-transformation computed from a comparison between some at least of the points of interest in the representation of the target in the respective frame and the respective stored points of interest.

8. Apparatus according to claim 7, wherein said means for evaluating global motion of the image comprises means for smoothing the image in each frame in turn and computing estimates of a motion parameter.

9. Apparatus according to claim 7, wherein the means for evaluating global motion comprises means for computing the motion of a scene as seen by the camera between a previous frame and each current frame.

10. Apparatus according to claim 7, wherein said target finding means comprises:
an interest point operator for extracting said interest points on neighbourhoods;
a focus-of-attention sub-module for selecting the interest points most likely to be found in the target, based on color information;
a point matcher sub-module for finding a set of corresponding points between interest points in a stored model of the target and interest points found in each actual frame in turn;
a precise lock-in sub-module for finding a precise location of the target in the frame, from the correspondences given by said point matcher sub-module; and
a predictor sub-module for predicting the location of the target in any frame of order n, assuming that the target was found in another frame of the sequence, based on information received from the precise lock-in sub-module and from the means for evaluating global motion of the image.

11. Apparatus according to claim 16, further comprising an updater module for collecting data from other said means and interpolating information between said frames.

12. Apparatus according to claim 11, wherein said updater module comprises a circular buffer memory having a plurality of successive cells each storing attributes of one said frame, said attributes comprising at least one of:
a global motion transformation between the respective frame and a next frame, plus a measure of belief,
a transformation between the respective said frame and a next said frame, plus a measure of belief,
a flag representing the position of the respective said frame in a respective said sequence, and
a linked list of hypotheses, each containing a plurality of indications on edges of the target in image coordinates, plus a measure of belief.

13. Apparatus according to claim 11, wherein said means for evaluating global motion further include a sequence break detection sub-module for signalling sudden changes between successive said frames and communicating said changes to said updater unit for recordal among said attributes.

14. Apparatus according to claim 7, further comprising obstacle detection means for comparing a stored model of the target and the target representation in each said frame, for warping the target representation to make it match the stored model, for computing differences and for communicating said differences to said replacer means as an obstacle map.

15. Apparatus according to claim 14, wherein said replacer means comprises means for warping said stored pattern for making it match the respective representation of said target and means for substituting all pixels in said respective representation, except those represented by said obstacle map, with corresponding pixels of the warped stored pattern.

16. A method of manipulating video images which belong to a sequence and which are mutually correlated, said method comprising the steps of:

storing a representation of a target to be identified in said images;

storing a plurality of successive ones of said images of said sequence in a buffer memory;

searching for the target in the stored images by pattern recognition until the target is found with reliability in one at least of said stored images;

carrying out reverse and forward predictions as to the location of the target in those of said stored images preceding and following the image where the target is found, based on an evaluation of global changes of the images, whereby precise identification of the location of the target in a particular one of said images is achieved even when only part of the target is available within the particular image.

* * * * *